United States Patent Office 3,219,717
Patented Nov. 23, 1965

3,219,717
PURIFICATION OF HYDROCARBONS
Earl T. Niles, Danville, Calif., assignor to The Dow Chemical Company, Midland, Mich., a corporation of Delaware
No Drawing. Filed Nov. 8, 1962, Ser. No. 236,402
9 Claims. (Cl. 260—666)

This invention relates to the purification of hydrocarbons and more particularly to the removal of trace amounts of olefins from saturated hydrocarbons.

Many methods have been used to separate mixtures of hydrocarbons having components with varying amounts of unsaturation. Thus, it has long been known that gaseous olefins may be extracted from mixtures with saturated hydrocarbons by aqueous solutions of copper (I), silver, mercury (II), and platinum (II) salts. Liquid mono- and diolefins will also react at ordinary temperatures with aqueous solutions of salts of a variety of heavy metals such as copper, silver, mercury, platinum, palladium, iron, iridium, and other members of Groups IB, IIB and VIII of the Periodic Table (cf. J. C. Bailar, Jr., "The Chemistry of the Coordination Compounds," Reinhold Publishing Corporation, N.Y., 1956, Ch. 15).

Although the exact structure of the metal-olefin complexes which are formed is not known, it is generally recognized that for a given metal, the more highly unsaturated olefins form the more stable complexes. Furthermore, the stability of the metal-olefin complex is markedly influenced by such variables as temperature or pressure. Thus, it is often possible to recover an olefin or diolefin from a metal-olefin complex by mild heating or reduction of pressure.

To minimize corrosion problems and the expense of drying operations in purifying hydrocarbons, it is often preferable to avoid aqueous reagents. Thus, it is desirable to have a method for achieving purification through the formation of metal-olefin complexes in a non-aqueous system.

It is an object of the present invention to provide a non-aqueous process for the removal of trace amounts of unsaturated hydrocarbons from a hydrocarbon mixture. Another object is to provide a process for the separation and recovery of unsaturated hydrocarbons from a mixture with less highly unsaturated hydrocarbons. A still further object is to provide a process which is readily adaptable to commercial operation.

These and other objectives are obtained by treating the hydrocarbon mixture with a heavy metal salt of a cation exchange resin wherein said heavy metal is selected from Groups IB and IIB of the Periodic Table of the Elements to form a complex of the more highly unsaturated hydrocarbons with said heavy metal resin salt, and separating the uncomplexed hydrocarbons having a reduced unsaturation from said olefin-resin salt complex. It has been further discovered that the olefin-resin salt complex so formed is decomposed by heating, thus permitting regeneration of the resin salt and recovery of a concentrate of the more highly unsaturated components of the original hydrocarbon mixture.

The term "unsaturated" as used herein applies to aliphatic or cyclic olefinic and diolefinic hydrocarbons, e.g., butene, butadiene, cyclohexene, isobutylene, and the like. While aromatic rings are not included within this term as used, it does however include unsaturation due to olefinic or diolefinic substituents on an aromatic ring and hence to compounds such as styrene, divinyltoluene, and the like.

The invention is well adapted for the separation of a variety of hydrocarbon mixtures. Thus, aliphatic or cyclic olefins and diolefins may be separated from hydrocarbon mixtures also containing saturated and/or aromatic hydrocarbons, the latter materials being unreactive with the heavy metal resin salt used in this invention. For example, normally gaseous unsaturated compounds such as ethylene, propylene and butadiene may be separated from gaseous mixtures also containing saturated hydrocarbons. Normally liquid olefins, such as pentene, cyclopentenes, isoprene, heptene, and the like, may be separated from liquid hydrocarbon mixtures which also contain saturated and/or aromatic hydrocarbons. In addition, aromatic hydrocarbons having unsaturated ring substituents can be separated from mixtures with aromatic hydrocarbons with only saturated substituents, e.g., styrene from ethylbenzene, by the method of this invention. It is also within the scope of this invention to separate unsaturated hydrocarbons of varying degrees of unsaturation. Since diolefins are more reactive with the solid cation exchange resin of this invention than monoolefins, butadiene may be separated from butylene, cyclopentadiene from cyclopentene, etc., by the practice of this invention. It is readily adapted for the treatment of normally gaseous hydrocarbons such as those obtained by the cracking of petroleum fractions for the concentration of olefins or diolefins contained therein. Also light petroleum liquids, such as gasoline, naphtha, and the like, containing olefins or diolefins are also successfully treated by the invention.

The cation exchange resin of this invention is preferably a synthetic organic cation exchange resin having free sulfonic, phosphoric, phosphonic, or carboxylic acid groups in the form of salts thereof with heavy metal ions of Groups IB and IIB of the Periodic Table, such as copper, silver, and mercury.

The cation exchange resin used in the process of this invention must have a molecular weight high enough or be sufficiently cross-linked so as to be substantially insoluble in water up to a temperature of 100° C. Such resins must also have adequate physical strength and a good exchange capacity and exchange rate.

Included among the suitable resins are those prepared from a solid phenol-formaldehyde condensation product or from suitably cross-linked solid polymers of vinyl aromatic compounds, such as styrene or vinyltoluene, by sulfonation, phosphonation, or other chemical treatment to introduce the necessary inorganic acid substituent on the aromatic nucleus of the resin. It is desirable to use a resin having from 0.5 to 1.25 inorganic acid substituents per aromatic nucleus. Particularly satisfactory are commercial cation exchange resins prepared by the nuclear sulfonation of a cross-linked poly(vinylaromatic) resin, such as Dowex 50 and 50W resins, Amberlite IR 112, 120, and 150 resins, and Permutit Q resins.

Alternately, carboxylic acid cation exchange resins prepared by copolymerization of a vinyl aromatic compound with such other monomers as acrylonitrile, acrylic acid, acrylamide, methyl acrylate, methacrylic acid, methyl methacrylate, etc., may be used. Particularly effective is the acrylic acid based carboxylic cation exchange resin sold under the trade name of Amberlite IRC–50 resin.

The desired heavy metal salt of the cation exchange resin is readily prepared by conventional ion exchange techniques using a standard acid (H+) or sodium (Na+) form of the resin. However, in using a carboxylate cation exchange resin, the sodium form is preferred. The cation exchange resin may be slurried with an aqueous solution of a water-soluble salt of the desired metal cation such as $AgNO_3$, $Cu_2Cl_2$, $HgCl_2$, etc. After an exchange of substantially all the hydrogen or sodium ions, the resin is washed free of excess salt and then dried. Alternately, the conversion of the cation exchange resin into the heavy metal salt form can also be accomplished by passing a solution of the desired salt through a column or bed of the ion exchange resin.

Since the copper resin salt preferably contains the metal in the monovalent cuprous form, solutions of such cuprous salts as cuprous chloride are generally used. However, the cuprous resin salt can also be made from a cupric resin salt by reduction with a suitable reducing agent, such as sulfur dioxide, ethyl mercaptan, and alkali metal hydrosulfite, or the like.

In carrying out the present invention the hydrocarbon mixture to be separated is intimately contacted with the heavy metal resin salt at a temperature suitable for the formation of the desired olefin-resin salt complex. In general temperatures below 40° C. and preferably within the range from about −30° to +30° C. are used. However, still lower temperatures are sometimes advantageous provided the hydrocarbon mixture remains gaseous or liquid at the operating temperature.

The intimate contact between the hydrocarbon mixture and the heavy metal resin salt may be achieved by any of the well-known ion exchange techniques. For example, this contact may be effected by passing the hydrocarbon mixture through a stationary bed of the granular resin with a preferred flow rate of from 0.5 to 4 bed volumes per hour. Alternately, the resin may be slurried with a liquid hydrocarbon mixture in a batch process or employed in a conventional moving or fluidized bed. The contact may be continuous or batchwise, concurrent or countercurrent, according to the requirements of the particular application.

The contact time, the amount of resin salt, and other similar variables are dependent upon the degree of separation and purification desired as well as upon such other factors as the composition of the hydrocarbon mixtures, the physical properties and capacity of the cation exchange resin, and the like. However, optimum conditions within the teaching disclosed herein are readily determined by simple tests.

In the practice of this invention, the initial hydrocarbon mixture is contacted with a heavy metal salt of a cation exchange resin until the capacity of the resin salt is nearly or completely exhausted through reaction with the more highly unsaturated components of the hydrocarbon mixture. The unreacted, less highly unsaturated hydrocarbons are separated from the olefin-resin salt complex by such convenional means as elution, decantation, filtration, etc. Then the olefin-resin salt complex is treated to recover the reacted unsaturated components and to regenerate the heavy metal cation exchange resin.

The recovery treatment comprises heating the olefin-resin salt complex to a temperature sufficient to decompose the complex giving an enriched fraction of more highly unsaturated hydrocarbons and regenerating the resin salt. Although the temperature required for decomposing the olefin-resin salt complex will depend upon the particular complex involved, normally temperatures in the range of about 40–100° C. are suitable for the decomposition of these complexes. At temperatures appreciably higher than 100° C. the cation exchange resin may be destroyed. The decomposition is facilitated through the use of reduced pressure or an inert stripping gas such as nitrogen.

The unsaturated hydrocarbon fraction recovered from the decomposition olefin-resin salt comprises a product enriched with the more highly unsaturated components of the initial hydrocarbon mixture. The regenerated heavy metal cation exchange resin salt may be recycled for reuse. Also by appropriate recycling of the hydrocarbon fractions and by control of the reaction conditions, hydrocarbon mixtures of the type described herein may be separated into fractions of high purity by the method of this invention.

In order that those skilled in the art may better understand the invention described herein, the following examples are given by way of illustration and not by way of limitation.

EXAMPLE 1—SILVER CARBOXYLATE RESIN

To a slurry of water and 120 ml. of wet Amberlite IRC–50 resin, $H^+$ form (a commercial polyacrylic acid resin having a wet capacity of about 3.5 meq./ml.), was added sufficient caustic to convert the resin into the $Na^+$ form. The resin was then washed free of caustic and stirred with a solution of 60 g. $AgNO_3$ in 100 ml. of water until the silver content of the resin was 3.1 meq./ml.

EXAMPLE 2—REMOVAL OF 1-PENTENE FROM PENTANE

The silver carboxylate resin prepared in Example 1 was placed in a jacketed 14 mm. inside diameter (I.D.) ion exchange column and washed thoroughly with water to remove excess silver nitrate, then with alcohol, and finally with pentane to obtain an anhydrous resin. The column was cooled externally to −26° C. and a 1% solution of 1-pentene in pentane passed through the column at a flow rate of about 4.2 ml./min. The eluent was collected in 10 ml. portions and analyzed by vapor phase chromatography. No pentene was found in the eluent until after 120 ml. of the feed solution had been passed through the column; then there was a sharp breakthrough. Assuming a theoretical capacity of 1 meq. olefin/meq. $Ag^+$, about 3.5% of the theoretical resin salt capacity was used before the breakthrough of pentene.

EXAMPLE 3—REGENERATION OF THE SILVER CARBOXYLATE RESIN

To establish the feasibility of resin regeneration, a 100 ml. column of silver carboxylate resin prepared as in Example 1 and having a capacity of 1.8 meq./ml. was used. A 2% solution of 1-pentene in pentane was passed through the column at a rate of from 8 to 10 ml. per minute and the eluent cuts analyzed by differential infrared techniques.

Data on the operating temperature of the column and the eluent compositions are presented in Table 1. Between each cycle the column was regenerated by removing the coolant in the column jacket and slowly heating the column for 5–10 minutes with steam. The vapors collected from the column during these regenerations showed a very high percentage of 1-pentene. It was also noted that the column darkened somewhat during the regeneration step.

*Table 1—Resin recycle*

| Cycle | T., °C. | Eluent Cut Volume, ml. | Percent 1-Pentene Removed | | |
|---|---|---|---|---|---|
| | | | Cut I | Cut II | Cut III |
| 1 | −45 | 50 | 100 | 90 | |
| 2 | −45 | 50 | 100 | 90 | |
| 3 | 0 | 50 | 80 | 43 | |
| 4 | −16 | 25 | 99.4 | 80 | 58 |

It is clear that the silver column may be regenerated effectively. Since no precaution was taken during this regeneration to eliminate oxygen from the system, it is possible that the darkening of the ion exchange resin was due to an oxidative decomposition. By purging the column with an inert gas, such as nitrogen, during the regeneration and by controlling the regeneration temperature, the loss of resin capacity can be minimized.

EXAMPLE 4—OTHER OLEFIN SYSTEMS

The general utility of the silver carboxylate resin in the separation of olefins was established by vigorously mixing in a sealed flask a 10 ml. sample of a resin having a silver content of 3.23 meq./ml. with 20 ml. of a 5% solution of olefin in pentane. A sample of the pentane solution was taken immediately after the initial addition to the resin. Then the mixture was cooled with stirring for a half-hour in a Dry Ice-acetone bath before separating the pentane solution from the resin. Samples of the initial and final pentane solutions were analyzed by gas-liquid chromatography. Typical data from these experiments are given in Table 2.

*Table 2.—Separation of olefin-pentane mixtures*

| Olefin: | Percent olefin removed |
|---|---|
| 1-hexene | 97.5 |
| 1-heptene | 54 |
| Cyclohexene | 67 |
| 1-octene | 41 |
| 1-decene | 67 |
| 2-pentene | 12 |

In similar experiments cyclohexene was removed from cyclohexane, and 1-hexene was removed from hexane.

EXAMPLE 5—SILVER SULFONATE RESIN

In a 14 mm. I.D. ion exchange column, 100 ml. of wet 50–100 mesh Dowex 50W–X8 resin (a commercial sulfonated styrene-divinylbenzene copolymer having a capacity of 1.9 meq./ml. wet resin) was converted into the silver form by passing an excess of N/1 $AgNO_3$ through the column. The column was then washed free of excess silver and dried by washing successively with ethanol and then pentane. About 200 meq. $Ag^+$ was retained by the sulfonated resin.

To the column of the silver sulfonate resin at room temperature was added 100 ml. of 1% 1-pentene in pentane at a feed rate of about 2.5 ml./min. There was no pentene in the first 30 ml. of eluent. But a breakthrough of pentene occurred after about 35 ml. of eluent was collected, indicating an effective olefin capacity of about 1.2% of the theoretical based on the $Ag^+$ content of the resin. However the resin capacity was not completely exhausted even after the entire 100 ml. of feed solution had been passed through the column.

In experiments similar to those described in Example 4, it was found that the silver sulfonate resin removed 64% of the 1-pentene at −50° C. and about 77% at 26° C. Also the silver sulfonate resin could be regenerated by heating at 40–100° C.

EXAMPLE 6—CUPROUS SULFONATE RESIN

A cuprous sulfonate resin was prepared from a column of Dowex 50W–X8 resin by first washing the resin column with methanol and then passing a cuprous chloride solution in dimethyl formamide slowly through the resin bed. After rinsing out the excess cuprous chloride, the dimethyl formamide was displaced with pentane. The resulting cuprous sulfonate resin was similar in olefin capacity and stability to the silver sulfonate resin described in Example 5.

I claim:

1. A process for separating unsaturated hydrocarbons selected from the class consisting of olefins, diolefins, and mixtures thereof, from a mixture with less highly unsaturated hydrocarbons which consists of (a) reacting said hydrocarbon mixture with a heavy metal salt of a cation exchange resin wherein said heavy metal is selected from Groups IB and IIB of the Periodic Table to form a complex of said resin with the more highly unsaturated hydrocarbons, and (b) separating from the olefin-resin salt complex a hydrocarbon mixture having reduced unsaturation.

2. The method of claim 1 wherein the heavy metal cation is a monovalent silver ion.

3. The method of claim 1 wherein the heavy metal cation is a monovalent copper ion.

4. The method of claim 1 wherein the cation exchange resin is a water-insoluble polycarboxylic acid resin.

5. The method of claim 1 wherein the hydrocarbon mixture is reacted with the heavy metal resin salt at a temperature below 30° C.

6. The method of claim 1 wherein the olefin-resin salt complex is decomposed by heating at a temperature up to 100° C. to give a hydrocarbon product having enriched unsaturation.

7. The method of claim 2 wherein 1-pentene is separated from a mixture with pentane.

8. The method of claim 2 wherein cyclohexene is separated from a mixture with pentane.

9. The method of claim 2 wherein cyclohexene is separated from a mixture with cyclohexane.

References Cited by the Examiner

UNITED STATES PATENTS 2,865,970   12/1958   Thomas _____ 260—666

ALPHONSO D. SULLIVAN, *Primary Examiner.*